United States Patent
Jeong (10) Patent No.: US 6,588,456 B2
(45) Date of Patent: Jul. 8, 2003

(54) PRESSURE-RESISTANT HOSE USING POLYETHYLENE FABRICS

(76) Inventor: In Seon Jeong, 10-701 Kwangjang Keukdong Apartment, 218-1 Kwangjang-dong, Kwangjin-ku, Seoul 143-210 (KR)

( * ) Notice: Subject to any disclaimer, the term of this patent is extended or adjusted under 35 U.S.C. 154(b) by 0 days.

(21) Appl. No.: 09/972,838

(22) Filed: Oct. 5, 2001

(65) Prior Publication Data

US 2002/0033196 A1 Mar. 21, 2002

Related U.S. Application Data

(63) Continuation of application No. PCT/KR00/00320, filed on Apr. 7, 2000.

(30) Foreign Application Priority Data

| Apr. 8, 1999 | (KR) | 99-12386 |
| Dec. 13, 1999 | (KR) | 99-57003 |
| Feb. 24, 2000 | (KR) | 2000-9070 |

(51) Int. Cl.[7] ................................................. F16L 11/00
(52) U.S. Cl. ........................ 138/125; 138/141; 138/140; 138/123
(58) Field of Search ............................... 138/123, 125, 138/124, 126, 137, 141

(56) References Cited

U.S. PATENT DOCUMENTS

| 4,576,205 A | * | 3/1986 | Morinaga et al. | 138/124 |
| 4,600,615 A | * | 7/1986 | Hyodo et al. | 138/125 |
| 4,684,556 A | * | 8/1987 | Ohtsuga et al. | 138/124 |
| 4,724,178 A | * | 2/1988 | Hyodo et al. | 138/124 |

* cited by examiner

*Primary Examiner*—Patrick Brinson
(74) *Attorney, Agent, or Firm*—Darby & Darby (57) ABSTRACT

The present invention relates to a pressure-resistant hose and forming method thereof, which is capable of effectively spouting liquid or gas of high pressure even though the pressure-resistant hose is of a relatively small thickness, reducing the material cost of the pressure-resistant hose and improving the flexibility of the pressure-resistant hose. The Pressure-resistant hose comprises a first polyethylene mixture and one or more second hose layers. The first hose layer is formed by bonding together longitudinal ends of a first polyethylene mixture fabric coated with one or two watertight films at one or both surfaces of the first polyethylene mixture fabric. Each of said second hose layers if formed by bonding together longitudinal ends of a second polyethylene mixture fabric coated with one or two watertight films at one or both surfaces of the second polyethylene mixture fabric.

6 Claims, 11 Drawing Sheets

PRESSURE-RESISTANT HOSE USING POLYETHYLENE FABRICS

This is a continuation of international application Serial No. PCT/KR00/00320, filed Apr. 7, 2000, the entire disclosure of which is hereby incorporated by reference.

TECHNICAL FIELD

The present invention relates, in general, to a pressure-resistant hose and forming method thereof and, more particularly, to a pressure-resistant hose and forming method thereof, which is capable of effectively spouting liquid or gas of high pressure even though the pressure-resistant hose is of a relatively small thickness, reducing the material cost of the pressure-resistant hose and improving the flexibility of the pressure-resistant hose.

BACKGROUND ART

In general, a pressure-hose is utilized to convey liquid or gas to a certain location, and requires pressure-resistance and flexibility.

In order to fulfill such requirements, the inventor of the present invention proposed a multi-layered hose having fabric layers. The conventional pressure-resistant tube comprises a first tube layer, a second tube layer and a third tube layer. The tube layers are generally made of rubber of PolyVinyl Chloride (PVC). A first fabric layer is bonded on the outer surface of the first tube layer. The second tube layer is combined with the first fabric layer at the outer surface of the first fabric layer. A second fabric layer is bonded on the outer surface of the second tube layer. The third tube layer is combined with the second fabric layer on the outer surface of the second fabric layer. The first and second fabric layers are employed while being braided to have a predetermined density. The first and second fabric layers are respectively bonded on the outer surfaces of the first and second tube layers by heating using stream. The second and third tube layers are combined with the first and second fabric layers by extruding the second and third tube layers to the outer surfaces of the first and second fabric layers, respectively.

However, in the conventional pressure-resistant tube constructed as described above, since the first, second and third tube layers are made of rubber or PVC and the first and second fabric layers are interposed between the neighboring tube layers of the first, second and third tube layers, the entire thickness of the pressure-resistant hose becomes relatively large, increasing its manufacturing cost, deteriorating its flexibility, and reducing productivity in its manufacture owing to its complexity in construction.

DISCLOSURE OF THE INVENTION

Accordingly, the present invention has been made keeping in mind the above problems occurring in the prior art, and an object of first, second and third inventions is to provide a pressure-resistant hose and forming method thereof, which is capable of effectively spouting liquid or gas of high pressure even though the pressure-resistant hose is of a relatively small thickness, reducing the material cost of the pressure-resistant hose, improving the flexibility of the pressure-resistant hose and increasing productivity in manufacturing the pressure-resistant hose due to the simplicity in the construction of the pressure-resistant hose.

An object of a fourth invention is to provide a pressure-resistant hose forming apparatus and method that is capable of preventing the pressure-resistant hose from being scratched and cooling frictional heat generated between a fabric sheet and the apparatus by continuously supplied air to prevent the fabric sheet from being expanded and contracted.

BRIEF DESCRIPTION OF THE DRAWINGS

The above and other objects, features and other advantages of the present invention will be more clearly understood from the following detailed description taken in conjunction with the accompanying drawings, in which.

BEST MODE OF CARRYING OUT THE INVENTION

In accordance with an aspect of a first invention, there is provided a pressure-resistant hose, comprising a first hose layer, the first hose layer being formed by bonding together longitudinal ends of a first polyethylene mixture fabric coated with one or two watertight films at one or both surfaces of the first polyethylene mixture fabric; and one or more second hose layers, each of the second hose layers being formed by bonding together longitudinal ends of a second polyethylene mixture fabric coated with one or two watertight films at one or both surfaces of the second polyethylene mixture fabric.

In accordance with another aspect of the first invention, the bonded portions of the first hose layer and the second hose layers are circumferentially spaced apart from one another so as not to be overlapped.

In accordance with a further aspect of the first invention, there is provided a resistant-pressure hose forming method, comprising: rendering a first polyethylene mixture fabric to have a circular cross section by passing the first polyethylene mixture fabric, coated with watertight films at one or both surfaces, through a first guide member to overlap a first longitudinal end of the first polyethylene mixture fabric on a second longitudinal end; continuously applying a bonding agent on one longitudinal end of the first polyethylene mixture fabric; forming a first bonded portion by bonding together both longitudinal ends of the first polyethylene mixture fabric while guiding the first polyethylene mixture fabric to surround an outer surface of the central pipe; continuously applying a bonding agent on an outer surface of the first polyethylene mixture fabric, which is being moved along an outer surface of the central pipe, at a plurality of positions; rendering a second polyethylene mixture fabric to have a circular cross section by passing the second polyethylene mixture fabric, which is coated with watertight films at one or both surfaces, through a second guide member to overlap a first longitudinal end of the second polyethylene mixture fabric on a second longitudinal end; continuously applying a bonding agent on one longitudinal end of the second polyethylene mixture fabric; bonding the second polyethylene mixture fabric on the first polyethylene mixture fabric at a plurality of positions, on which the bonding agent is applied, while guiding the second polyethylene mixture fabric to surround the first polyethylene mixture fabric along an outer surface of the central pipe; and forming a second bonded portion by bonding together both longitudinal ends of the second polyethylene mixture fabric that is moved together with the first polyethylene mixture fabric along the central pipe.

In accordance with yet another aspect of the first invention, the method further comprises the step of pressing a finished pressure-resistant hose by means of a pair of pressing rollers so as to wind the finished pressure-resistant hose around a winding roll.

In accordance with still further aspect of the first invention, the first guide member and the second guide member are spaced apart from each other along a circumferential direction of the central pipe so as to prevent the first bonded portion from being overlapped with the second bonded portion.

According to the above-described characteristics of the first invention, since the pressure-resistant hose is fabricated using two or more layers of polyethylene mixture fabrics coated with one or two watertight films at one or both surfaces of each and bonded together at both longitudinal ends of each, the pressure-resistant hose is capable of effectively spouting liquid or gas of high pressure even though the pressure-resistant hose is of a relatively small thickness, reducing the material cost of the pressure-resistant hose and improving the flexibility of the pressure-resistant hose.

Reference now should be made to the drawings, in which the same reference numerals are used throughout the different drawings to designate the same or similar components.

Figure 1:
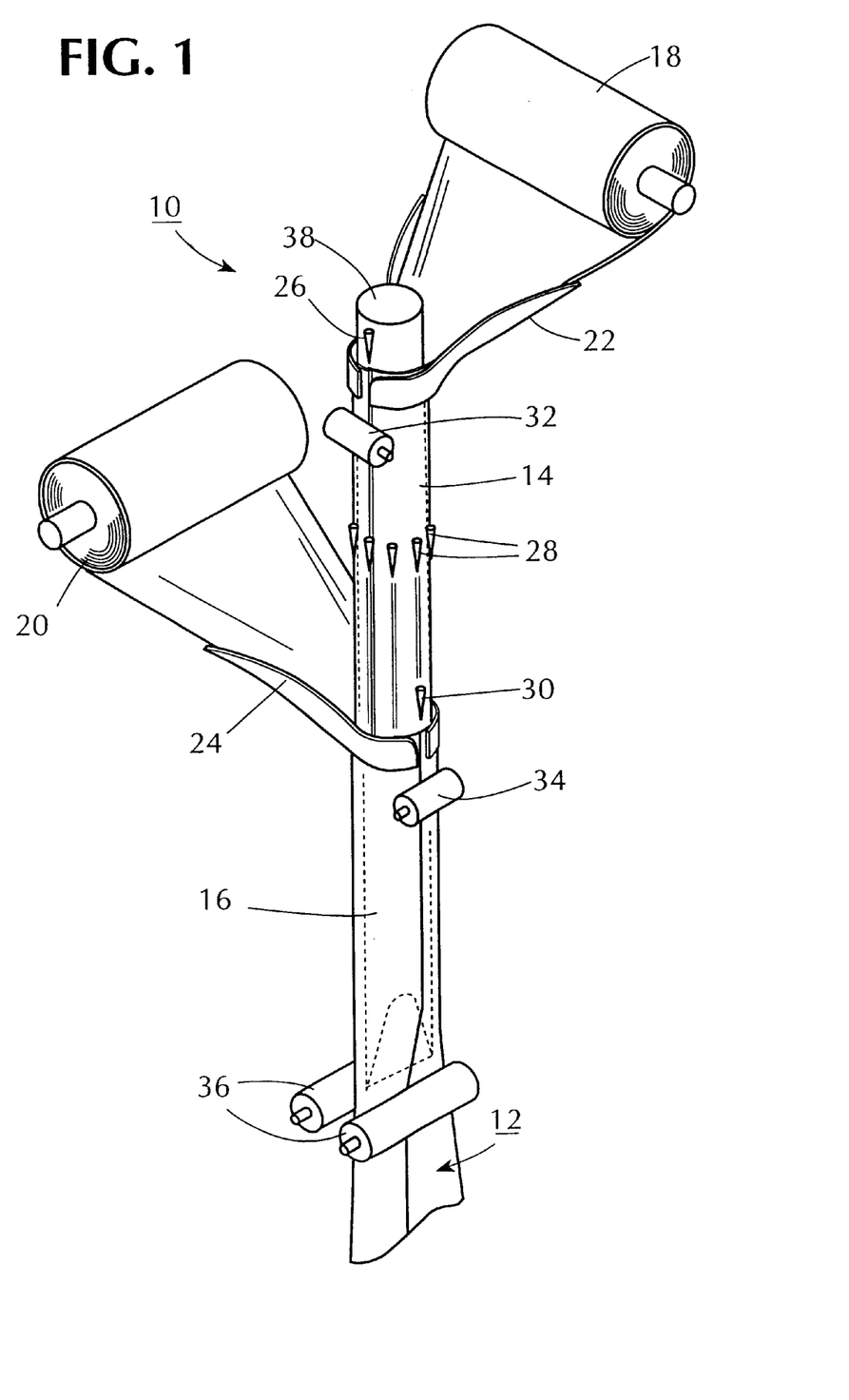
FIG. 1 is a perspective view illustrating the schematic construction of a pressure-resistant hose forming apparatus in accordance with a first invention.
Figure 2:
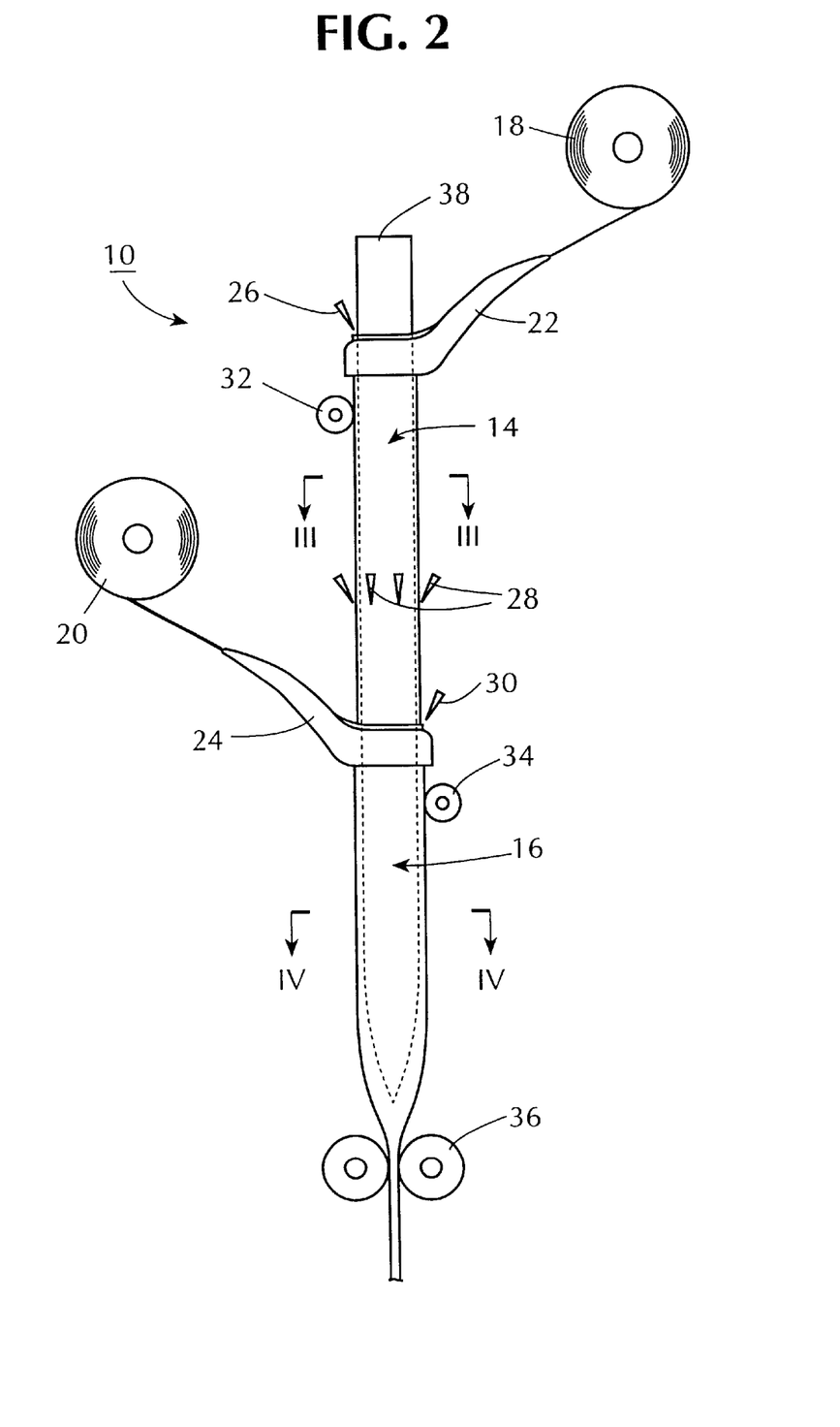
FIG. 2 is a side elevation showing the pressure-resistant hose forming apparatus in accordance with the first invention.
Figure 3:
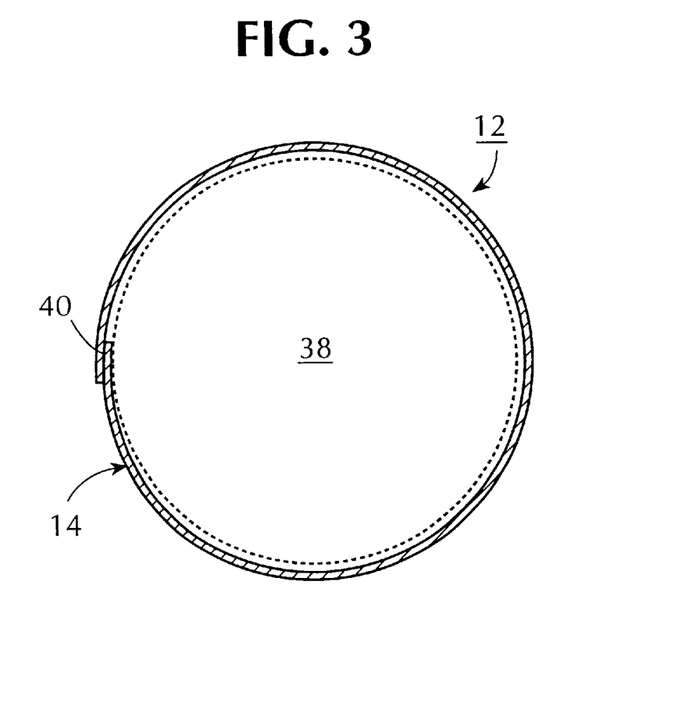
FIG. 3 is a cross section taken along line III—III of FIG. 2, showing a first hose layer that is bonded at its longitudinal ends by the forming apparatus in accordance with the first invention.
Figure 4:
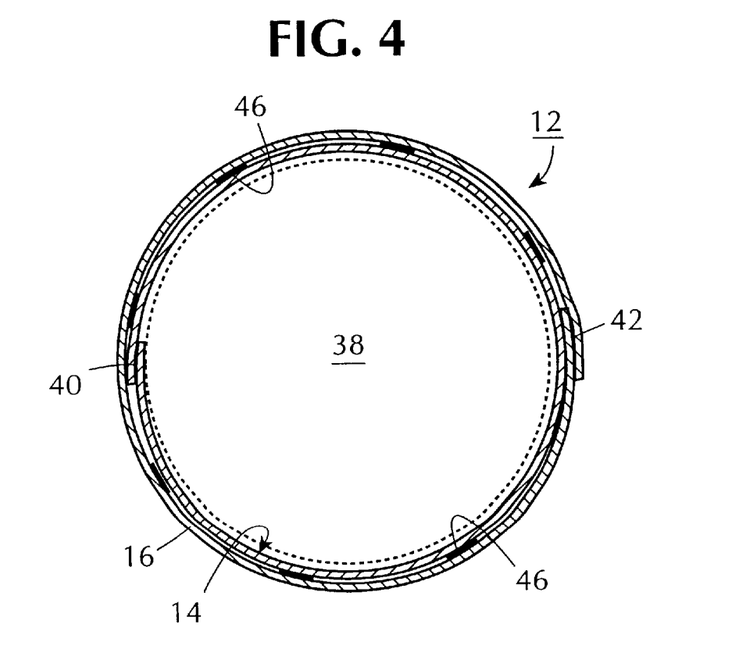
FIG. 4 is a cross section taken along line IV—IV of FIG. 2, showing a pressure-resistant hose that is formed to have two hose layers by the forming apparatus in accordance with the first invention.
Figure 5:
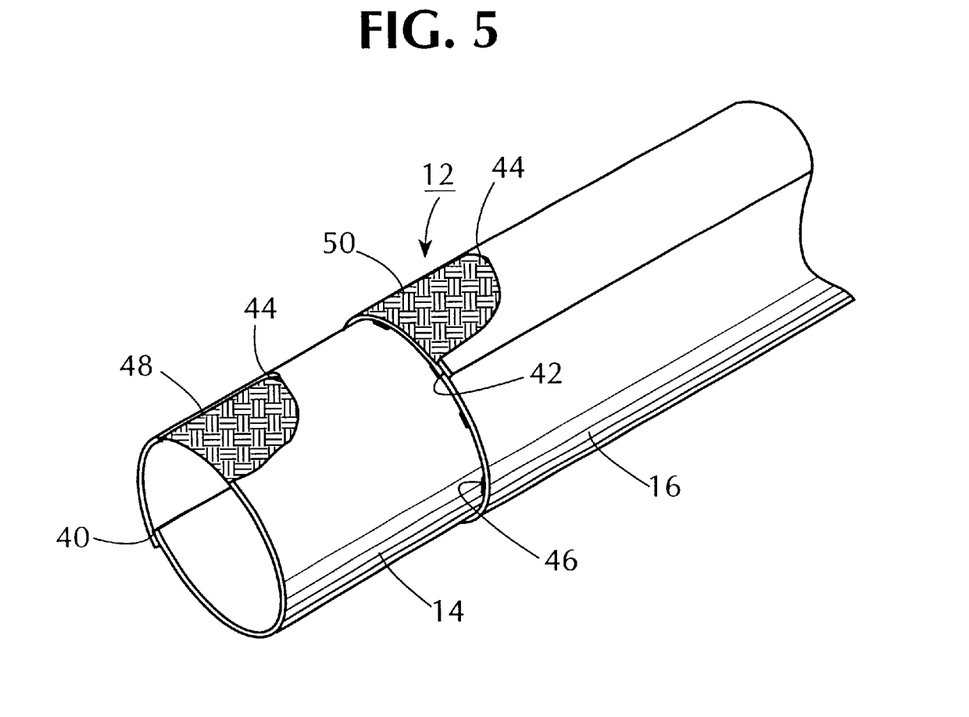
FIG. 5 is a partially enlarged perspective view showing the construction of the pressure-resistant hose formed in accordance with the first invention.

FIG. 1 is a perspective view illustrating the schematic construction of a pressure-resistant hose forming apparatus in accordance with the first invention. FIG. 2 is a side elevation showing the pressure-resistant hose forming apparatus in accordance with the first invention. FIG. 3 is a cross section taken along line III—III of FIG. 2, showing a first hose layer that is bonded at its longitudinal ends by the forming apparatus in accordance with the first invention. FIG. 4 is a cross section taken along line IV—IV of FIG. 2, showing a pressure-resistant hose that is formed to have two hose layers by the forming apparatus in accordance with the first invention. FIG. 5 is a partially enlarged perspective view showing the construction of the pressure-resistant hose formed in accordance with the first invention.

The pressure-resistant hose 12 according to the first invention comprises a first hose layer 14 and a second hose layer 16. The first and second hose layers 14 and 16 are respectively made of a first polyethylene mixture fabric 48 and a second polyethylene mixture fabric 50.

The first polyethylene mixture fabric 48 and the second polyethylene mixture fabric 50 are respectively coated with watertight films 44 on both side surfaces. The first polyethylene mixture fabric 48 and the second polyethylene mixture fabric 50 are respectively bonded together at their longitudinal ends to form circular cross sections, thus forming a first bonded portion 40 and a second bonded portion 42.

The outer surface of the first hose layer 14 and the inner surface of the second hose layer 16 are securely bonded together by longitudinally extending bonding strips 46, so that the first and second hose layers 14 and 16 are not moved respectively. The first bonded portion 40 of the first hose layer 14 and the second bonded portion 42 of the second hose layer 16 are spaced apart from each other in a circumferential direction to prevent one from being overlapped with the other. With such constructions, there is prevented a problem in which pressure-resistance is deteriorated at a location where the first bonded portion 40 of the first hose layer 14 is overlapped with the second bonded portion 42 of the second hose layer 16.

In a preferred embodiment of the first invention, the first bonded portion 40 of the first hose layer 14 and the second bonded portion 42 of the second hose layer 16 are spaced apart from each other in a circumferential direction by 180 degrees.

The pressure-resistant forming apparatus 10 of the first invention includes a central pipe 38 that is extended vertically. A first supply roll 18 is disposed at a position away from the upper end of the central pipe, 38 to upward and lateral directions so as to continuously supply the first polyethylene mixture fabric 48 coated with watertight films 44 on its inner and outer surfaces. A first guide member 22 is disposed between the upper end of the central pipe 38 and the first supply roll 18 so as to guide the continuously supplied first polyethylene mixture fabric 48 to form a circular cross section by overlapping one longitudinal end of the first polyethylene mixture fabric 48 with the other longitudinal end.

A first bonding agent applying nozzle 26 is located slightly over a position where one longitudinal end of the first polyethylene mixture fabric 48 is overlapped with the other longitudinal end of the first polyethylene mixture fabric 48. The first bonding agent applying nozzle 26 serves to continuously apply a bonding agent on one longitudinal end of the first polyethylene mixture fabric 48. The first polyethylene mixture fabric 48 guided to have a circular cross section with a bonding agent being applied on its one longitudinal end is moved while surrounding the outer surface of the central pipe 38.

A first pressing roller 32 is disposed at a position under the upper end of the central pipe 38 beside the central pipe 38. The first pressing roller 32 serves to press both longitudinal ends of the first polyethylene mixture fabric 48 toward the central pipe 38 to be bonded, thus forming the first bonded portion 40. Accordingly, the forming of the first hose layer is completed.

A second supply roll 20 is disposed at a position away from the center portion of the central pipe 38 to upward and lateral directions so as to continuously supply the first polyethylene mixture fabric 50 coated with watertight films 44 on its inner and outer surfaces.

A plurality of second bonding agent applying nozzles 28 surround the second polyethylene mixture fabric 50. The second bonding agent applying nozzles 28 served to continuously apply longitudinally extending bonding agents on the first hose layer 14, which is moved along the outer surface of the central pipe 38, at a plurality of positions and which form longitudinally extending bonding strips 46.

A second guide member 24 is disposed between the center portion of the central pipe 38 and the second supply roll 20 so as to guide the continuously supplied second polyethylene mixture fabric 50 to have a circular cross section by overlapping one longitudinal end of the second polyethylene mixture fabric 50 with the other longitudinal end. A third bonding agent applying nozzle 30 is located slightly over a position where one longitudinal end of the second polyethylene mixture fabric 50 is overlapped with the other longitudinal end. The third bonding agent applying nozzle 30 serves to continuously apply a bonding agent on one longitudinal end of the second polyethylene mixture fabric 50.

The second polyethylene mixture fabric 50, which is guided to have a circular cross section with a bonding agent being applied on one longitudinal end, is moved while surrounding the outer surface of the central pipe 38. As a result, the second polyethylene mixture fabric 50 is bonded on the first hose layer 14 by means of the bonding agent applied on the outer surface of the first hose layer 14 at a plurality of positions by the nozzles 28.

A second pressing roller 34 is disposed at a position under the second guide member 24 beside the central pipe 38. The second pressing roller 34 serves to press both longitudinal ends of the second polyethylene mixture fabric 50 toward the central pipe 38 to be bonded together, thus forming the second bonded portion 42. Accordingly, the forming of the pressure-resistant hose 12 having two hose layers is completed.

A pair of third pressing rollers 36 are disposed under the lower end of the central pipe 38. The third pressing rollers 36 serve to press the finished pressure-resistant hose to reduce its volume.

The pressed pressure-resistant hose 12 is wound around a winding roll (not shown) disposed under the third pressing rollers 36.

In accordance with an aspect of the second and third inventions, there is provided a pressure-resistant hose, comprising: a plurality of polyethylene mixture fabrics and a plurality of watertight films, the polyethylene mixture fabrics and the watertight films being laminated together; and a polyethylene protection film laminated on at least one of inner and outer surfaces of the laminated body to form a fabric sheet; wherein a first longitudinal end of the fabric sheet is laminated on a second longitudinal end with the polyethylene protection film being disposed to constitute an innermost layer of the fabric film, so as to form a hose.

In accordance with another aspect of the second invention, the fabric sheet is formed in such a way that the polyethylene mixture fabrics and watertight films are alternately laminated to form a first auxiliary sheet layer so that the watertight films are disposed on both surfaces of the laminated body, and the polyethylene protection film is laminated on the outer surface of the first auxiliary sheet layer.

In accordance with a further aspect of the second invention, the fabric sheet is formed in such a way that the watertight films are respectively laminated on both surfaces of each of the polyethylene mixture fabrics into a plurality of second auxiliary sheet layers, bonding watertight films are laminated between the second auxiliary layers into a multi-layered structure, and the polyethylene protection film is disposed on the outer surface of the multi-layered structure.

Figure 6:
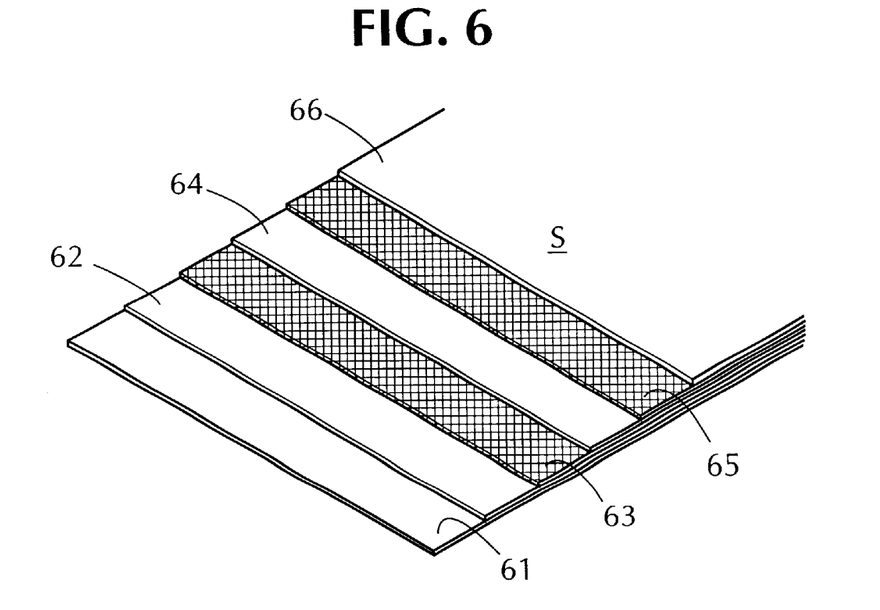
FIG. 6 is a perspective view showing a fabric sheet for a pressure-resistant hose in accordance with a second invention.
Figure 7:
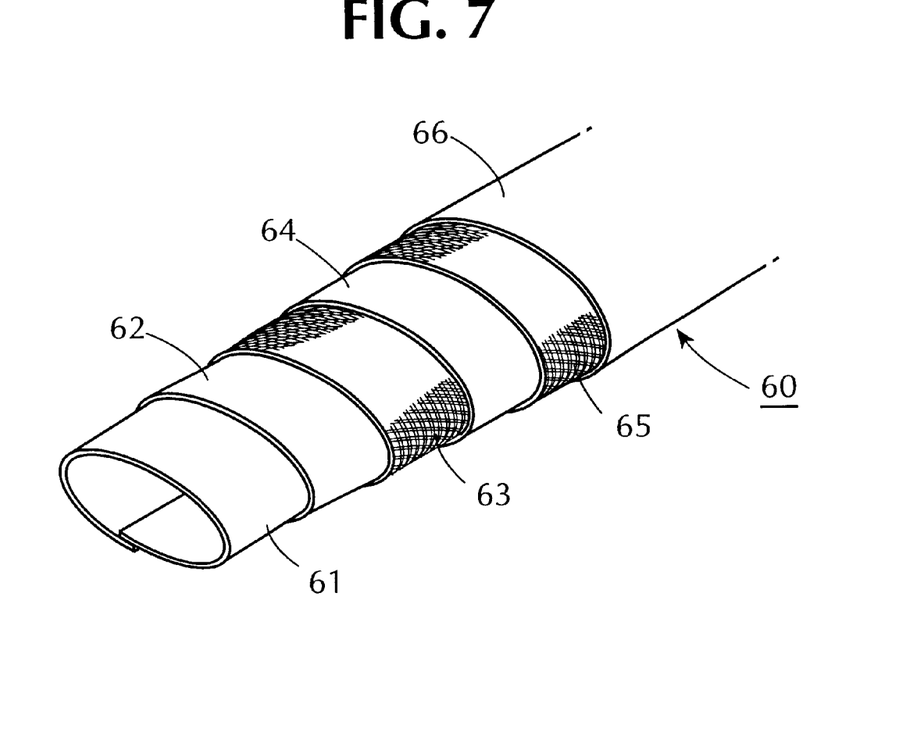
FIG. 7 is a perspective view showing a pressure-resistant hose fabricated using the fabric sheet of FIG. 6.

FIG. 6 is a perspective view showing a fabric sheet for a pressure-resistant hose in accordance with the second invention. FIG. 7 is a perspective view showing the pressure-resistant hose fabricated using the fabric sheet.

Figure 8:
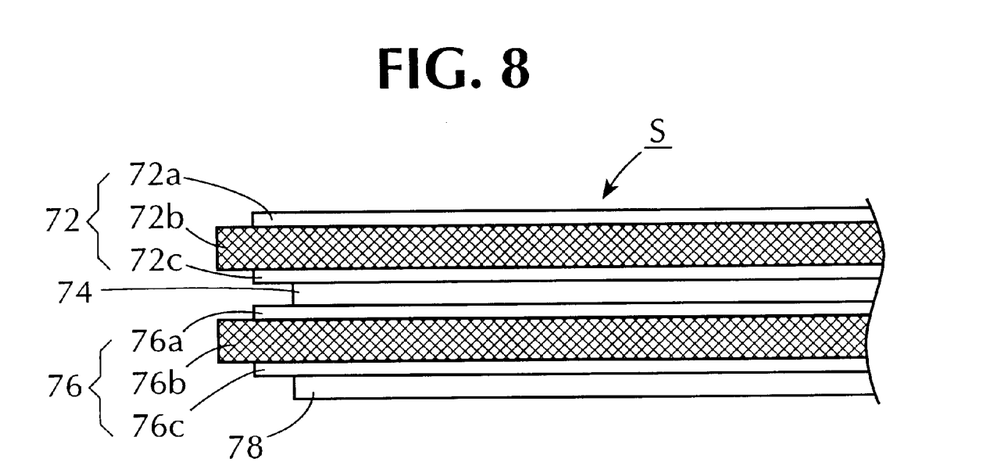
FIG. 8 is a sectional view showing another fabric sheet for a pressure-resistant hose in accordance with a third invention.
Figure 9:
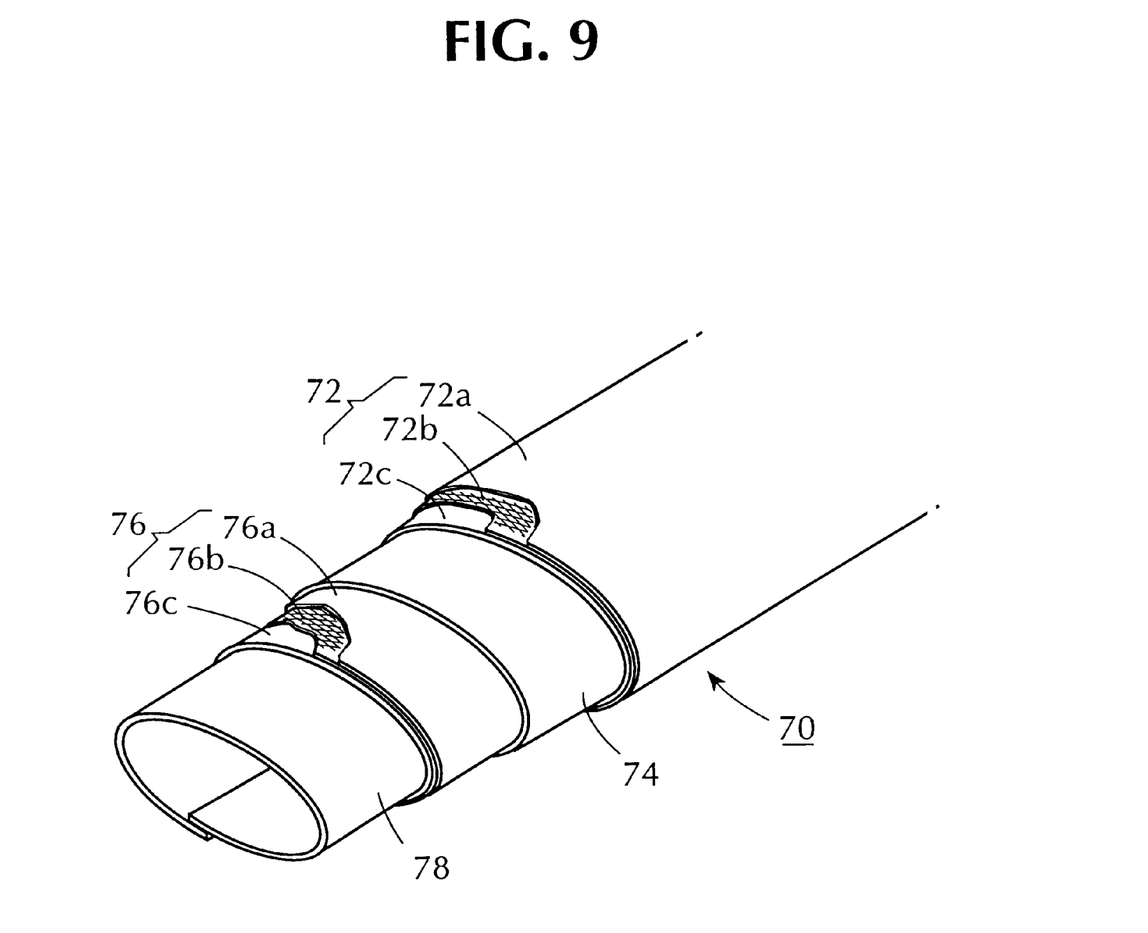
FIG. 9 is a perspective view showing the pressure-resistant hose fabricated using the fabric sheet of FIG. 8.

FIG. 8 is a sectional view showing another fabric sheet for a pressure-resistant hose in accordance with the third invention. FIG. 9 is a perspective view showing the pressure-resistant hose fabricated using the fabric sheet.

As illustrated in FIGS. 6 and 7, the pressure-resistant hose 60 of the second invention is fabricated in the form of a hose by overlapping one longitudinal end of the fabric sheet S including multi-layered polyethylene mixture fabric with the other longitudinal end. The pressure-resistant hose may be fabricated using the fabric sheet S made by laminating a polyethylene protection film 61 on the outer surface of a first auxiliary sheet layer 62 to 66.

The first auxiliary layer 62 to 66 is formed by alternately and fixedly laminating a plurality of polyethylene mixture fabric 63 and 65 and watertight films 62, 64 and 66. Since the watertight films 62 and 66 constitute the inner and outer surfaces of the first auxiliary layer 62 to 66, the polyethylene mixture fabrics 63 and 65 are not exposed.

When the first auxiliary sheet layer 62 to 66 is fabricated, the polyethylene mixtures 63 and 65 are fabricated to have melting points higher than the melting points of the watertight films 62, 64 and 66, thereby allowing the polyethylene mixture fabrics 63 and 65 to be securely combined with the watertight films 62, 64 and 66. The reason why the melting points of the polyethylene mixture fabrics 63 and 65 are designed to be different from the melting points of the watertight films 62, 64 and 66 is that combined portions may get loose when members having the same melting point are combined with each other.

The polyethylene protection film 61 fixedly laminated on the outer surface of the watertight film 62 is rendered to have a melting point higher than the melting point of the watertight film 62, thereby allowing the polyethylene protection film 61 to be securely laminated on the watertight film 62.

When the pressure-resistant hose 60 is fabricated using the fabric sheet S made as described above, one longitudinal end of the fabric sheet S is fixedly laminated on the other longitudinal end to form a hose with the polyethylene protection film 61 constituting the innermost layer of the hose, so that the pressure hose 60 is fabricated to have a strength that sufficiently stands the discharge pressure of gas or liquid passing through the pressure-resistant hose 60. In order to increase the strength of the pressure-resistant hose 60, an additional polyethylene protection film having a melting point higher than the melting point of the watertight film 66 may be fixedly laminated on the outer surface of the outermost watertight film 66.

FIGS. 8 and 9 are views showing the pressure-resistant hose in accordance with the third invention. The pressure-resistant hose 70 of the third invention is fabricated using a fabric sheet S that is made by fixedly laminating a plurality of second auxiliary sheet layers 72 and 76 including polyethylene mixture fabrics with a bonding watertight film 74 being interposed between the layers 72 and 76, and fixedly laminating a polyethylene protection film 78 on the outer surface of the previous laminated body.

The second auxiliary sheet layer 72 or 76 is made by respectively coating a pair of watertight films 72a and 72c, or 76a and 76c on both surfaces of the polyethylene mixture fabric 72b or 76b. In such a case, the watertight films 72a, 72c, 76a and 76c have melting points lower than the melting points of the polyethylene mixture fabrics of 72b and 76b, thereby allowing the laminated portions thereof to be securely combined.

The bonding watertight film 74 fixedly laminated while being interposed between the second auxiliary sheet layers 72 and 76 is rendered to have a melting point higher than the melting points of the neighboring watertight films 72c and 76a, so that the second auxiliary sheet layers 72 and 76 are securely laminated together with the bonding watertight film 74 being interposed between the second auxiliary layers 72 and 76.

The polyethylene protection film 78 fixedly laminated on the outer surface of the watertight film 76c is also rendered to have a melting point higher than the melting point of the watertight film 76c, thereby securely laminating the polyethylene protection film 78 on the watertight film 76c.

When the pressure-resistant hose 70 is fabricated using the fabric sheet S made as described above, one longitudinal end of the fabric sheet S is fixedly laminated on the other longitudinal end to form a hose with the polyethylene protection film 78 constituting the innermost layer of the hose, so that the pressure hose 70 is fabricated to have a strength that stands sufficiently the discharge pressure of gas or liquid passing through the pressure-resistant hose 70. In order to increase the strength of the pressure-resistant hose 70, an additional polyethylene protection film having a melting point higher than the watertight film 72a may be fixedly laminated on the outer surface of the outermost watertight film 72a.

As can seen from the above embodiment, the pressure-resistant hoses are fabricated using the multi-layered polyethylene fabric sheet S wherein two or more layers of polyethylene mixture fabrics are securely combined with one another, so that there are easily fabricated the pressure-resistant hoses 60 and 70 having a considerably small thickness and an inferior flexibility in comparison with a conventional pressure-resistant hose having a rubber tube layer and a plurality of fabric layers.

In fabricating the resistant-hoses 60 and 70, the upper construction of the construction of the forming apparatuses shown in FIGS. 1 and 2 should be modified. That is, the multi-layered polyethylene fabric sheet S is supplied instead of the first polyethylene mixture fabric S supplied from the above-described first guide member 22. With the modified construction, the pressure-resistant hoses 60 and 70 are formed in such a way that the first polyethylene mixture fabric S is rendered to surround the central pipe 38 with the ends of the first polyethylene mixture fabric S being bonded securely.

Figure 10:
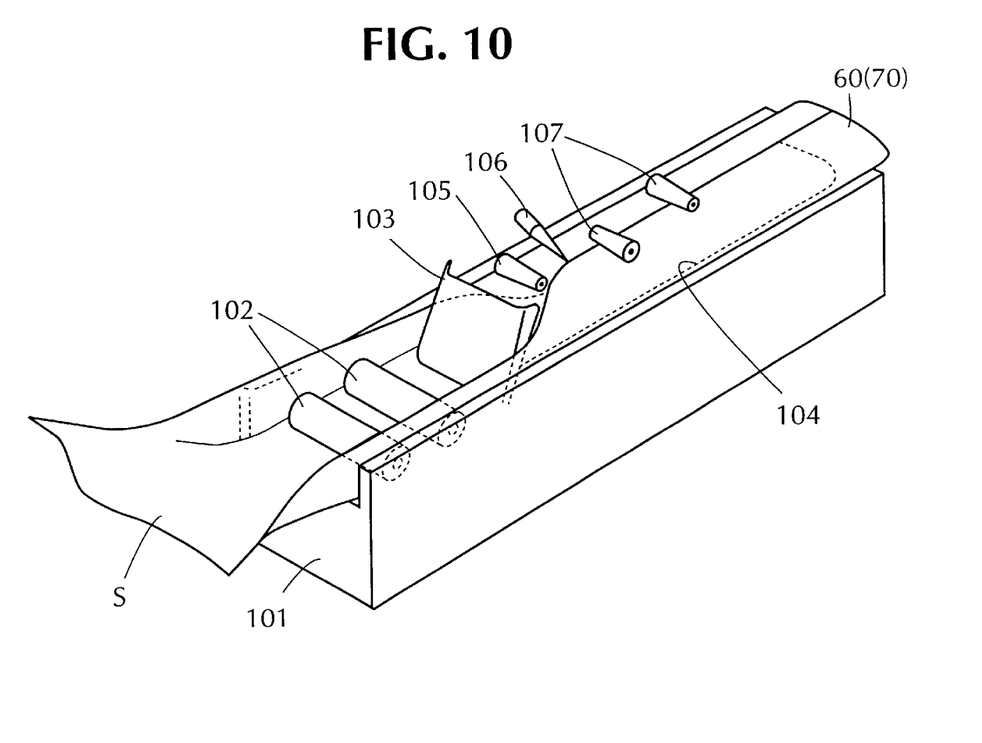
FIG. 10 is a perspective view showing a pressure-resistant hose forming apparatus in accordance with the second and third inventions.

FIG. 10 is a perspective view showing a pressure-resistant hose forming apparatus in accordance with the second and third inventions. The pressure-resistant hose forming apparatus includes a guide member 101 for guiding the polyethylene fabric sheet S supplied from a winding roll (not shown) with the side portions being bent.

Two pushing rollers 102 for pushing the fabric sheet S tightly on the guide member 101 are positioned over the guide member 101. A separating plate 103 is disposed behind the pushing rollers 102. Since the separating plate 103 is positioned to be spaced apart from the guide member 101, the fabric sheet S passes through the gap between the separating plate 103 and the guide member 101.

A central pipe 104 is longitudinally disposed behind the separating plate 103 so as to render the fabric sheet S to form a hose while surrounding the central pipe 104. A first guide roller 105 and second guide rollers 107 for overlapping one longitudinal end of the fabric sheet S surrounding the central pipe 104 with the other longitudinal end are arranged over the central pipe 104 in order. A bonding agent applying nozzle 106 for applying a bonding agent on the overlapped portion of the fabric sheet S is disposed between the first guide roller 105 and the second guide rollers 107.

With the above-described construction, the fabric sheet S supplied toward the guide member 101 is pushed to the upper surface of the guide member 101 and is moved with its side portions being bent upward, by the operation of the pushing rollers 102 and the separating plate 103. Thereafter, the fabric sheet S discharged through the gap between the separating plate 103 and the guide member 101 is moved along the outer surface of the central pipe 104. At this time, one longitudinal end of the fabric sheet S is pushed tight on the central pipe 104 by the first guide roller 105, a bonding agent is applied on the outer surface of the longitudinal end pushed tight on the central pipe 104 by the bonding agent applying nozzle 106, and the other longitudinal end of the fabric sheet S is pushed tight on the central pipe 104 while being overlapped with the former longitudinal end by the second guide roller 107. As a result, both longitudinal ends of the fabric sheet S are bonded together by means of the bonding agent, thus forming a hose.

Figure 11:
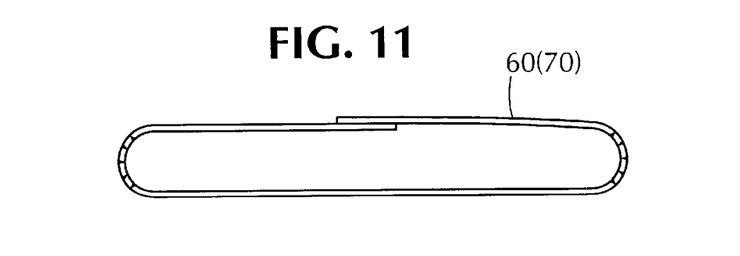
FIG. 11 is a sectional view showing a pressure-resistant hose formed by means of the apparatus of FIG. 10.

However, the pressure-resistant hose forming apparatus causes the supplied fabric sheet S to be bent abruptly in the process of being moved through the bent gap between the guide member 101 and the separating plate 103. As illustrated in FIG. 11, the inner surfaces of the side portions of the fabric sheet S are frequently scratched. Since the scratched hose may be easily ruptured when high pressure is applied to the hose, the scratched hose cannot be utilized as a reliable pressure-resistant hose.

Additionally, the pressure-resistant hose forming apparatus generates heat owing to continuous friction between the moved fabric sheet S and the apparatus. Such frictional heat causes the fabric sheet to be partially expanded and contracted, thereby deteriorating the strength of the fabricated hose.

The above-described defects can be effectively overcome by a pressure-resistant hose forming apparatus in accordance with a fourth invention. In the pressure-resistant hose forming apparatus in accordance with the fourth invention, as a fabric sheet supplied from a winding roll passes through the guide passages of a plurality of guide blocks mounted along a central pipe, the fabric sheet is gradually rounded around the central pipe to form a hose. As a result, the pressure-resistant hose is prevented from being scratched, so that the pressure-resistant hose is designed to stand its inner high pressure sufficiently when liquid or gas of high pressure is conveyed through the hose.

In accordance with an aspect of the fourth invention, there is provided a resistant-pressure hose forming apparatus, comprising: a central pipe disposed along a path through which a fabric sheet is moved, the central pipe having an outside diameter equal to an inside diameter of an objective pressure-resistant hose; a plurality of guide blocks arranged along the central pipe one after another, the guide blocks respectively having guide passages to form a hose in such a way that a first longitudinal end of the fabric sheet is overlapped with a second longitudinal end and the fabric sheet surrounds the central pipe while being moved along the central pipe; a bonding agent applying nozzle for continuously applying a bonding agent between the longitudinal ends of the fabric sheet that has passed through the guide blocks, the bonding agent applying nozzle being disposed behind the guide blocks; and one or more pressing rollers for pressing an overlapped portion of the fabric sheet toward the central pipe so that both overlapped longitudinal ends of the fabric sheet are bonded together by the bonding agent, the pressing roller being disposed behind the bonding agent applying nozzle.

In accordance with another aspect of the fourth invention, the guide blocks comprise: a first guide block surrounding the front outer surface of the central pipe and having a U-shaped first guide passage formed along a longitudinal direction of the central pipe to curve the fabric sheet supplied from the winding roll in the form of a "U"; a second guide block, the second guide block surrounding the central outer surface of the central pipe and having a second guide passage formed along a longitudinal direction of the central pipe to allow a half portion of the fabric sheet to surround the central pipe, left and right side portions of the second guide passage being respectively semi-U shaped and semicircular-shaped and the left and right side portions being connected at their lower ends; and a third guide block, the third guide block surrounding the rear outer surface of the central pipe and having a circular third guide passage formed along a longitudinal direction of the central pipe to allow the fabric sheet having passed through the third guide block to surround the central pipe while a first end of the fabric sheet is overlapped with a second end of the fabric sheet.

In accordance with a further aspect of the fourth invention, a plurality of air pressure chambers are formed on the upper and lower sides of the guide passages of the guide blocks so that air pressure applied from the outside is continuously applied to the air pressure chambers, so as to prevent friction between the fabric sheet and the guide blocks.

In accordance with yet another aspect of the fourth invention, a plurality of air supply conduits are longitudinally formed in the interior of the central pipe for supplying air from the outside, and a plurality of branches are radially formed to be extended from the air supply conduits to a portion of the outer surface of the central pipe with which the fabric sheet comes into contact, so as to prevent friction between the fabric sheet and guide blocks.

In accordance with a still further aspect of the fourth invention, a pressure-resistant hose forming method, comprising the steps of: moving a fabric sheet supplied from a winding roll along a central pipe; curving the fabric sheet to have a U-shaped cross section by passing the fabric sheet through a U-shaped first guide passage of a first guide block; allowing a half portion of the fabric sheet to surround a half portion of the central pipe by passing the U-shaped fabric sheet through a second guide passage of a second guide block, the second guide passage having a semicircular cross section and a semi-U cross section; overlapping a first longitudinal end of the fabric sheet on a second longitudinal end while the fabric sheet surrounds the central pipe and the first longitudinal end is spaced apart from the second longitudinal end, by passing the fabric sheet through a third guide passage of a third guide block; applying a bonding agent between both longitudinal ends of the fabric sheet; and bonding together the longitudinal ends of the fabric sheet with the bonding agent by pressing an overlapped portion of the fabric sheet, on which the bonding agent is applied, toward the central pipe is provided.

In accordance with an additional aspect of the fourth invention, the method further comprises the step of applying predetermined air pressure from the central pipe or guide blocks to the fabric sheet during the first to third steps so as to prevent friction between the fabric sheet and the central pipe, or guide blocks.

Figure 12:
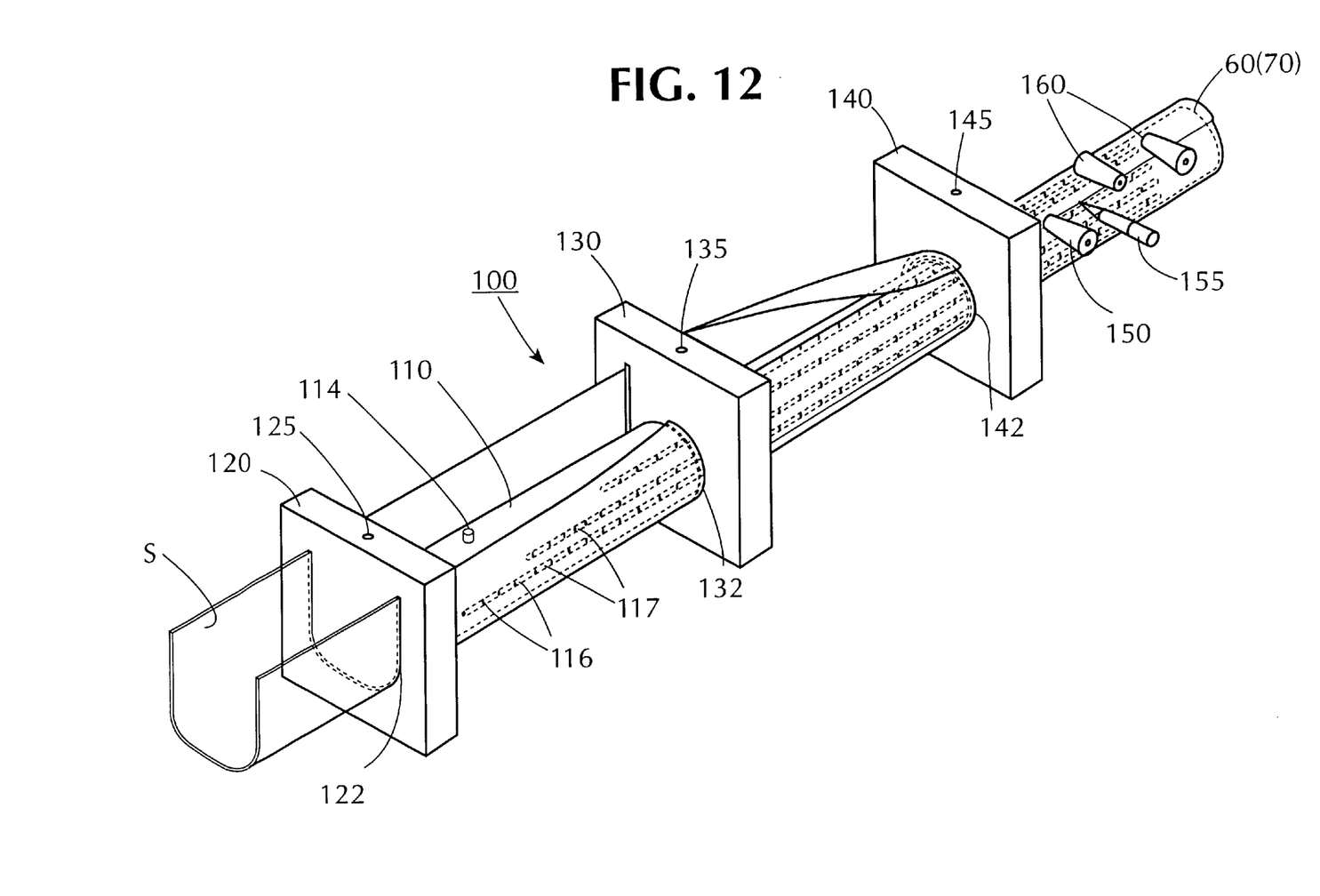
FIG. 12 is a perspective view illustrating a pressure-resistant hose forming apparatus in accordance with a fourth invention.
Figure 13:
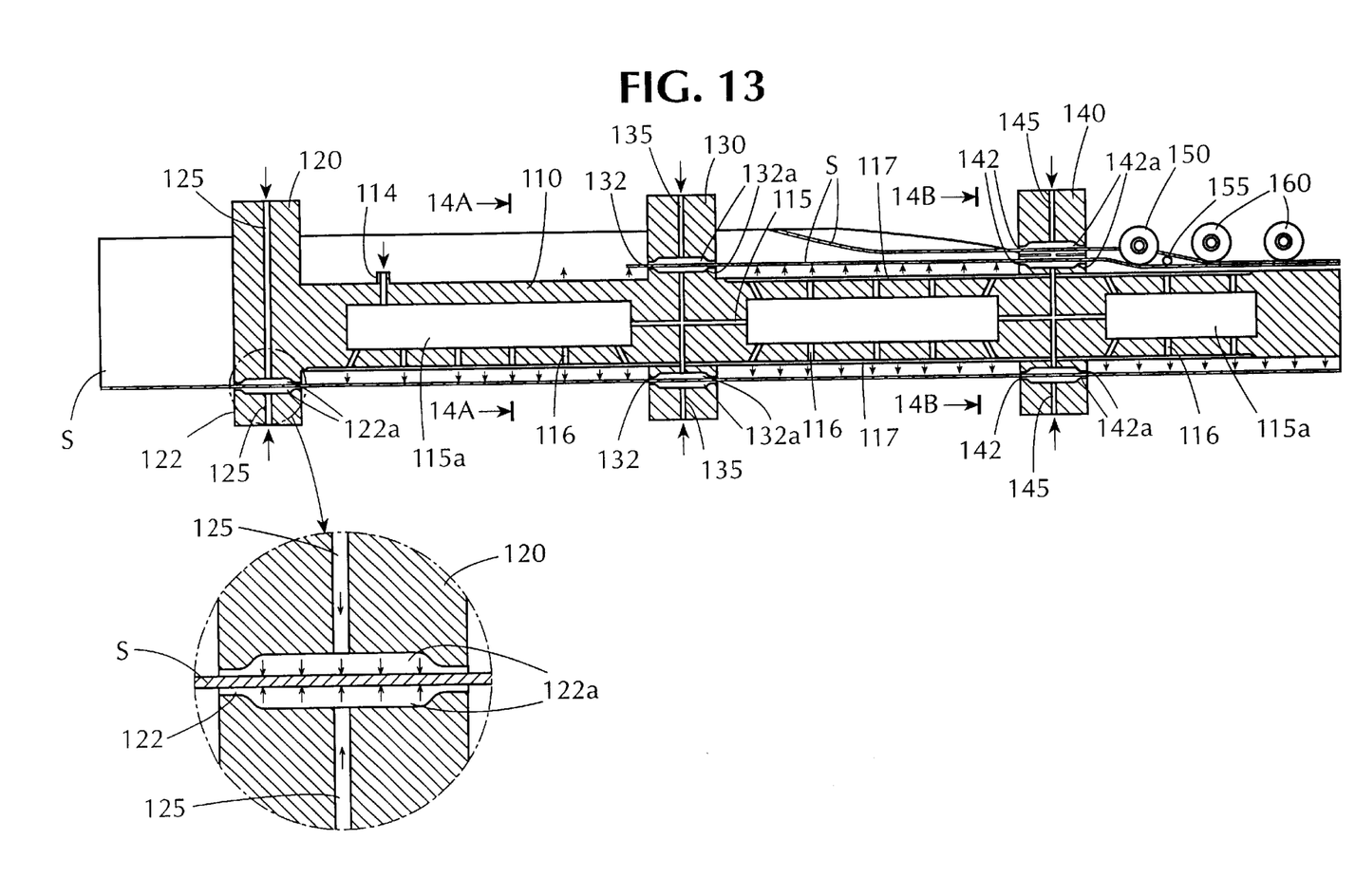
FIG. 13 is a side elevation of FIG. 12.
Figure 14A:
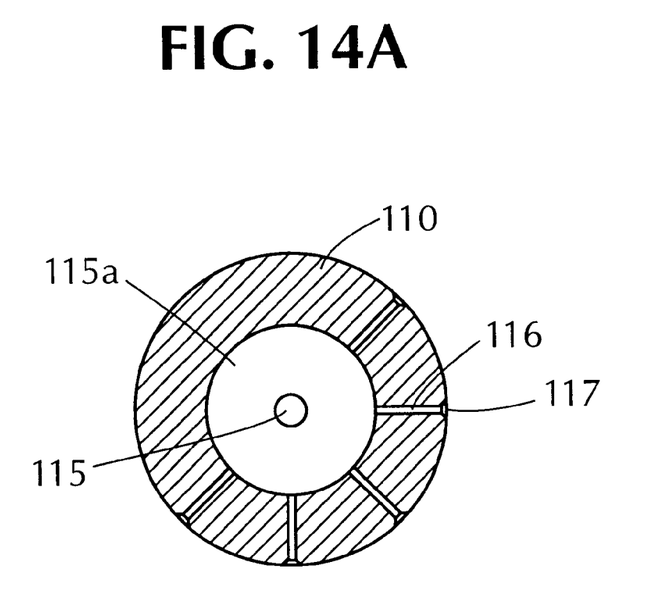
FIG. 14a is a sectional view taken along line A—A of FIG. 13.
Figure 14B:
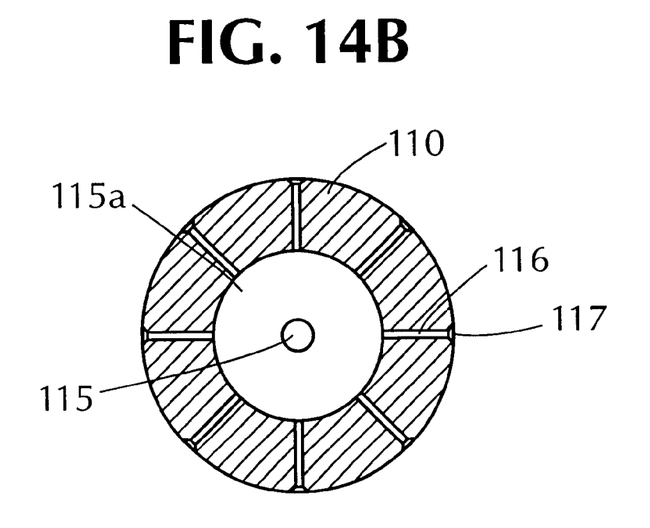
FIG. 14b is a sectional view taken along line B—B of FIG. 13.

FIG. 12 is a perspective view illustrating a pressure-resistant hose forming apparatus in accordance with the fourth invention. FIG. 13 is a side sectional elevation of the pressure-resistant hose forming apparatus. FIG. 14a is a sectional view taken along line A—A of FIG. 13. FIG. 14b is a sectional view taken along line B—B of FIG. 13. As shown in the drawings, the pressure-resistant hose forming apparatus 100 comprises a central pipe 110, a plurality of guide blocks 120 to 140, a roller 150, a bonding agent applying nozzle 155 and a pressing roller 160.

The central pipe 110 is a cylindrical body having an outside diameter equal to the inside diameter of an objective pressure-resistant hose. The central pipe 110 is longitudinally disposed so that the fabric sheet is moved through the central pipe 110 in the process of being formed.

The guide blocks 120 to 140 have guide passages so that the fabric sheet continuously moved through the central pipe 1 10 gradually surrounds the central pipe 110 and simultaneously one longitudinal end of the fabric sheet is overlapped with the other longitudinal end to form a hose having a desired shape. A plurality of guide blocks are arranged along the central pipe 110. The guide blocks may comprise three guide blocks 120 to 140 that are arranged while being spaced apart from each other.

The first guide block 120 is constructed to surround the front outer surface of the central pipe 110 and to have a U-shaped first guide passage 122 that is formed along the longitudinal direction of the central pipe 110. The first guide block 120 serves to curve the fabric sheet in the form of a "U" while the flat fabric sheet S supplied from the winding roll passes through the first guide passage 122 of the first guide block 120.

The second guide block 130 is constructed to surround the central outer surface of the central pipe 110 and to have a second guide passage 132 that is formed along the longitudinal direction of the central pipe 110. In this case, the left and right side portions of the second guide passage 132 are respectively semi-U-shaped and semicircular-shaped, and the left and right side portions are connected at their lower ends. The second guide block 130 serves to maintain the left side portion of the U-shaped fabric sheet S in a semi-U shape and to deform the right side portion of the U-shaped fabric sheet S in the form of a semicircle to surround the right portion of a central pipe 110 while the U-shaped fabric sheet S having passed through the first guide block 120 passes through the second guide block 130.

The third guide block 140 is constructed to surround the rear outer surface of the central pipe 110 and to have a circular third guide passage 142 that is formed along the longitudinal direction of the central pipe 110. In this case, the right side portion of the third guide passage 142 has a semicircular shape equal to the right side portion of the third guide passage 142 and the left side portion of the third guide passage 142 has a semicircular shape extended from the lower end of the right side portion of the third guide passage 142 to the left side portion of the second guide passage 142. The third guide block 140 selves to maintain the right side portion of the fabric sheet S in a semicircular shape and to deform the left side portion of the fabric sheet S in the form of a semicircle to surround the left portion of a central pipe 110 and to overlap one longitudinal end of the fabric sheet S on the other longitudinal end while the fabric sheet S passing through the second guide block 140 and having a semi-U-shaped left side portion and a semicircular right side portion passes through the third guide block 140.

The bonding agent applying nozzle 155 is disposed behind the guide blocks 120 to 140 so as to continuously apply a bonding agent between the longitudinal ends of the fabric sheet S that is moved with one longitudinal end of the fabric sheet S having been overlapped with the other longitudinal end while passing through the guide blocks 120 to 140. The roller 150 disposed in front of the bonding agent applying nozzle 155 serves to prepare a sufficient space, into which the bonding agent applying nozzle 155 is inserted, by pressing the lower longitudinal end of the longitudinal ends of the fabric sheet S on the central pipe 110. The pressing rollers 160 are disposed behind the bonding agent applying nozzle 155, and serve to press the overlapped portion on which the bonding agent is applied by the bonding agent applying nozzle 155.

Figure 15:
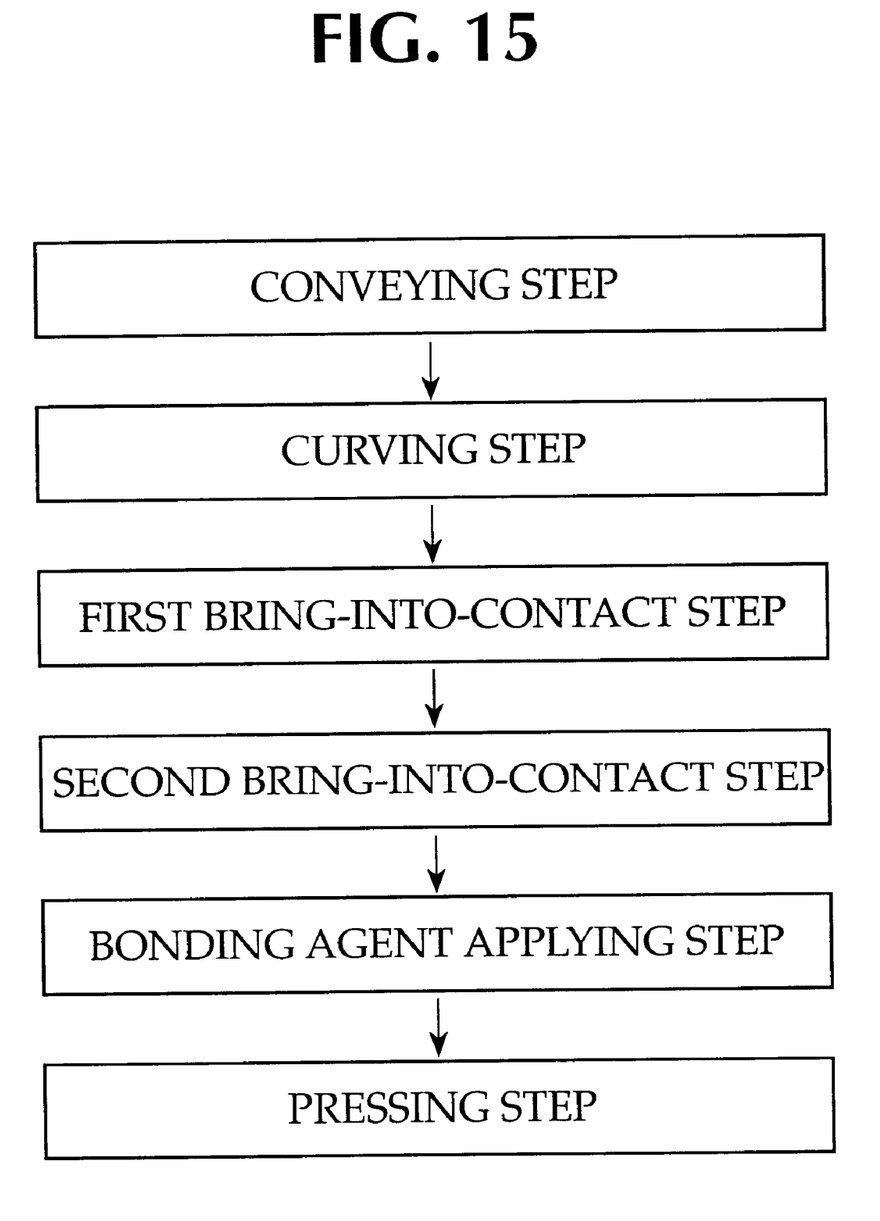
FIG. 15 is a flowchart showing a pressure-resistant hose forming method in accordance with the fourth invention.

The pressure-resistant hose forming method using the pressure-resistant hose forming apparatus 100 is described with reference to FIG. 15.

In a conveying step, the flat fabric sheet S wound around the winding roll is moved along the central pipe 110. Thereafter, there is performed a curving step wherein the fabric sheet S is curved to have a U-shaped cross section while the fabric sheet S supplied from the winding roll passes through the first guide passage 122 of the first guide block 120. The left side portion of the U-shaped fabric sheet S is maintained in a semi-U shape and the right side portion of the U-shaped fabric sheet S is deformed in the form of a semicircle to surround the right portion of a central pipe 110 while the U-shaped fabric sheet S passes through the second guide block 130 (a first bring-into-contact step).

The right side portion of the fabric sheet S is maintained in a semicircular shape and the left side portion of the fabric sheet S is deformed in the form of a semicircle to surround the left portion of a central pipe 110 and to overlap one longitudinal end of the fabric sheet S on the other longitudinal end while the fabric sheet S having a semi-U-shaped left side portion and a semicircular right side portion passes through the third guide block 140 (a second bring-into-contact step).

As described above, since both longitudinal ends of the fabric sheet S are pressed one after another to form a circle while the flat fabric sheet S moved along the central pipe 110 passes through a plurality of guide blocks 120 to 140, the friction between the fabric sheet S and the guide blocks 120 to 140 can be minimized, thereby preventing the fabric sheet S from being scratched by the guide blocks 120 to 140 or peripheral devices.

Although there has been described an example wherein three guide blocks 120 to 140 are employed, the number of the guide blocks can be varied as occasion demands. In such a case, the guide blocks must be arranged to gradually curve the fabric sheet S in the form of a circle as the fabric sheet S passes through the guide blocks.

After the second bring-into-contact step, there is performed a bonding agent applying step wherein the bonding agent is continuously applied between the longitudinal ends of the fabric sheet S that is moved while enclosing the central pipe 110. Both longitudinal ends of the fabric sheet S moved while surrounding the central pipe 110 are bonded together in such a way that the overlapped portion on which the bonding agent is applied in the bonding agent applying step is pressed by the pressing rollers 160 (a pressing step). Thus, a desired hose is fabricated.

In the meantime a plurality of air pressure chambers 122a to 142a may be formed on the upper and lower sides of the guide passages 122 to 142 of the guide blocks 120 to 140, so that air pressure can be continuously applied at the same pressure value to the air pressure chambers 122a to 142a from the outside. With the above construction, the fabric sheet S passing through the guide passages 122 to 142 of the guide blocks 120 to 140 are placed under the same air pressure, so that the friction between the fabric sheet S and the guide blocks 120 to 140 is scarcely generated, thereby preventing the fabric sheet S from being scratched and frictional heat from being generated.

In such a case, in order to allow the air pressure to be applied to the air pressure chambers 122a to 142a, there are formed a plurality of air supply conduits 125 to 145 extended from the outer surfaces of the guide blocks 120 to 140 to the air pressure chambers 122a to 142a. As illustrated in the drawing, the air pressure is preferably applied to some air pressure chambers through air supply conduits that pass through the interior of the central pipe 110.

In the interior of the central pipe 110, an air supply conduit 115 to which air is supplied from the outside is formed in the longitudinal direction of the central pipe 110, a plurality of longitudinal grooves 117 formed along the longitudinal direction of the central pipe 110 are formed in regular intervals on the outer surface of the central pipe 110 with which the fabric sheet S comes into contact, and a plurality of branches 116 are formed to be extended from the air supply conduit 115 to the longitudinal grooves 117. Reference number 115a designates air storage chambers that temporarily store air supplied from the outside.

With the above construction, air pressure applied from the outside is applied between the fabric sheet S moved along the central pipe 110 and the outer surface of the central pipe 110 through the air supply conduit 115, the air storage chambers 115a, the branches 116 and the longitudinal grooves 117 in order, thereby preventing the fabric sheet S from sticking to the central pipe 110 and, consequently, preventing the friction between the fabric sheet S and the outer surface of the central pipe, 10.

In such a case, the branches 116 and the longitudinal grooves 117 are formed on the portion of the outer surface of the central pipe 110 to which the fabric sheet S sticks, that is, the portion that the moved fabric sheet S surrounds, of the outer surface of the central pipe 110, thereby preventing air pressure from being reduced by the unnecessary discharge of air pressure.

INDUSTRIAL APPLICABILITY

As described above, in accordance with the present invention, a pressure-resistant hose is formed using two or more layers of polyethylene mixture fabrics whose longitudinal ends are bonded together and whose one side surface or both sides surfaces are coated with one or two watertight films, so that the pressure-resistant hose can be effectively utilized to sprout liquid or gas of high pressure, the thickness of the pressure-resistant hose is reduced, the material cost of the pressure-resistant hose is economized, the flexibility of the pressure-resistant hose is improved and the forming of the pressure-resistant hose is simplified and facilitated, in comparison with the conventional pressure-resistant hose having a plurality of rubber tube layers and a plurality of fabric layers.

In a pressure-resistant hose forming apparatus and pressure-resistant hose forming method in accordance with the present invention, since a fabric sheet supplied from a winding roll is gradually curved around a central pipe into a hose while passing through the guide passages of a plurality of guide blocks, a hose being fabricated is prevented from being scratched, so that a fabricated hose stands high pressure sufficiently when liquid or gas of high pressure is conveyed through the hose.

In accordance with the present invention, friction between a fabric sheet and a central pipe, or guide blocks is prevented in such a way that a constant air pressure is applied to the fabric sheet from the central pipe and the guide blocks, thereby preventing a fabricated pressure hose from being scratched and cooling frictional heat generated between the fabric sheet and the apparatus by means of air supplied continuously to prevent the fabric sheet from being expanded and contracted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, although a pressure-resistant hose is depicted to have two hose layers in the above-described embodiments, it should be understood that the pressure-resistant hose may be formed to have three or more hose layers.

What is claimed is:

1. A pressure-resistant hose, comprising:
    a first hose layer, the first hose layer being formed by bonding together longitudinal ends of a first polyethylene mixture fabric coated with one or two watertight films at one or both surfaces of the first polyethylene mixture fabric; and
    one or more second hose layers, each of said second hose layers being formed by bonding together longitudinal ends of a second polyethylene mixture fabric coated with one or two watertight films at one or both surfaces of the second polyethylene mixture fabric.

2. The hose according to claim 1, wherein the bonded portions of said first hose layer and said second hose layers are circumferentially spaced apart from one another so as not to be overlapped.

3. The hose according to claim 1, wherein a plurality of bonding agent strips are longitudinally formed on the contact surfaces of said first hose layer and said second hose layers.

4. A pressure-resistant hose, comprising:
    a plurality of polyethylene mixture fabrics and a plurality of watertight films, said polyethylene mixture fabrics and said watertight films being laminated together; and
    a polyethylene protection film laminated on at least one of inner and outer surfaces of the laminated body to form a fabric sheet;
    wherein a first longitudinal end of the fabric sheet is laminated on a second longitudinal end with the polyethylene protection film being disposed to constitute an innermost layer of the fabric film, so as to form a hose.

5. The hose according to claim 4, wherein said fabric sheet is formed in such a way that said polyethylene mixture fabrics and watertight films are alternately laminated to form a first auxiliary sheet layer so that said watertight films are disposed on both surfaces of the laminated body and said polyethylene protection film is laminated on an outer surface of said first auxiliary sheet layer.

6. The hose according to claim 4, wherein said fabric sheet is formed in such a way that said watertight films are respectively laminated on both surfaces of each of said polyethylene mixture fabrics into a plurality of second auxiliary sheet layers, bonding watertight films are laminated between the second auxiliary layers into a multi-layered structure, and said polyethylene protection film is disposed on an outer surface of the multi-layered structure.

* * * * *